Patented Nov. 25, 1930

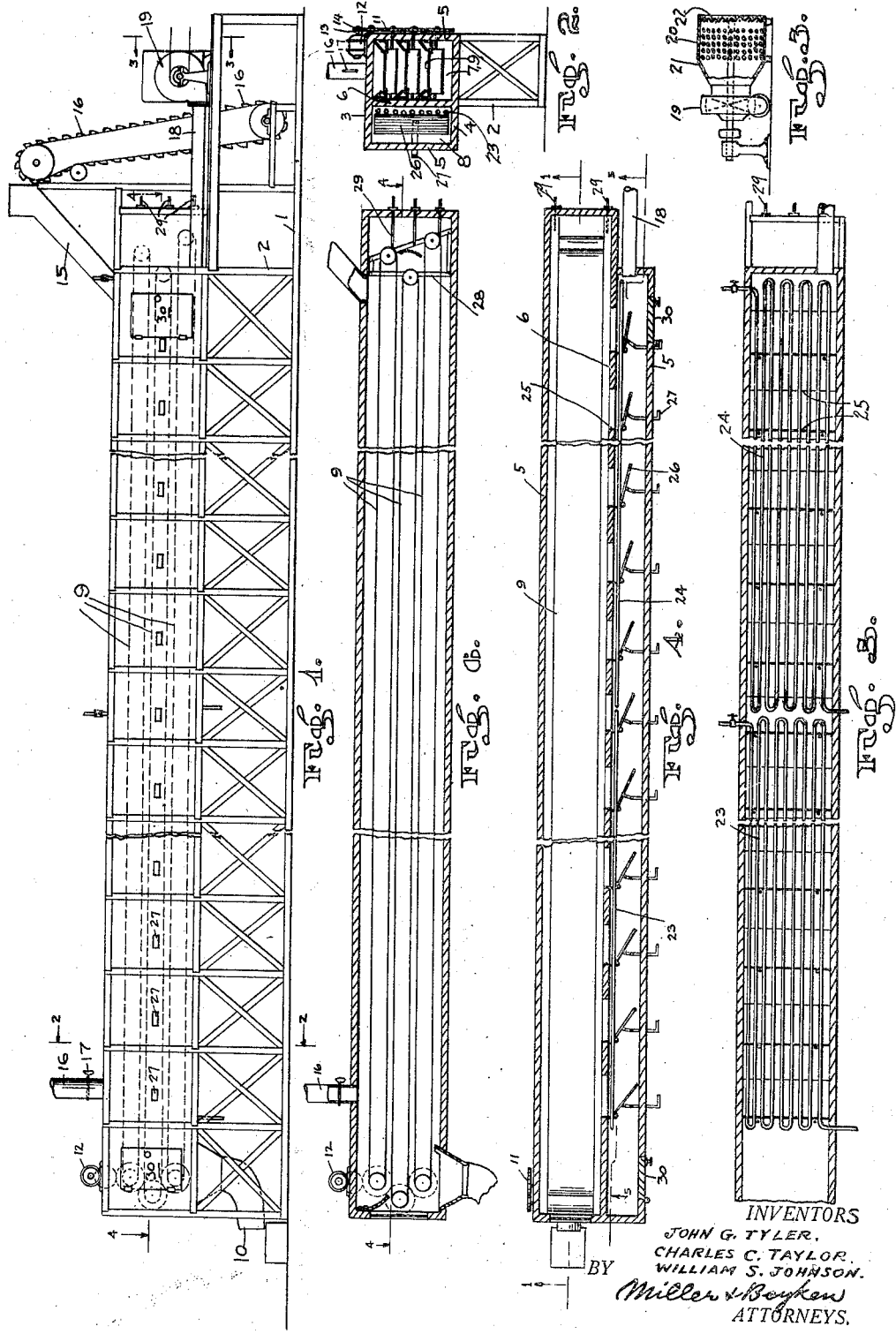
Nov. 25, 1930. J. G. TYLER ET AL 1,782,522
FIG STERILIZATION APPARATUS
Filed Nov. 14, 1927
INVENTORS
JOHN G. TYLER,
CHARLES C. TAYLOR,
WILLIAM S. JOHNSON.
BY Miller & Boyken
ATTORNEYS.

1,782,522

UNITED STATES PATENT OFFICE

JOHN G. TYLER, CHARLES C. TAYLOR, AND WILLIAM S. JOHNSON, OF FRESNO, CALIFORNIA, ASSIGNORS TO CALIFORNIA PEACH & FIG GROWERS ASSOCIATION, OF FRESNO, CALIFORNIA, A CORPORATION OF CALIFORNIA

FIG-STERILIZATION APPARATUS

Application filed November 14, 1927. Serial No. 233,014.

This invention relates to the sterilization of dried fruit preparatory to processing or packing, and has to do particularly with the sterilization of dried figs.

The objects of the invention are to provide a method and means for dried fig treatment whereby the fruit is quickly and thoroughly and cheaply sterilized so that it may be kept without deterioration for subsequent treatment or packing.

Briefly described the method comprises continuously treating the figs in a thin moving layer to a current of hot air without artificial humidity, until the fruit is raised to a temperature of about 210 degrees Fahrenheit and maintaining the fruit at this heat until all living cells and eggs of infestation are killed. The apparatus for the treatment comprises a long (about 50 feet) chamber with wire mesh belt conveyors therein carrying the fruit back and forth the length of the chamber, while heated air is admitted to the fruit at intervals along the chamber through special doors from an auxiliary chamber or hot air compartment running substantially the length of the belt conveyor chamber.

In the drawings hereto Fig. 1 is a side elevation of the apparatus with the long chamber broken to bring it within the drawing sheet. Fig. 2 is a vertical cross section of the chamber taken along the line 2—2 of Fig. 1. Fig. 3 is an end view of the air blower of Fig. 1 showing in section the air intake fitted with steam coils for preheating the air before it is forced into the auxiliary chamber. Fig. 4 is a sectional plan of the chamber showing the separately controlled heat deflecting doors in the wall separating the conveyor compartment from the auxiliary compartment or hot air chamber. Fig. 5 is a longitudinal elevation of the steam pipe coils in the auxiliary chamber; and Fig. 6 is a longitudinal section of the belt conveyor chamber showing the belt conveyor arrangement.

In the drawings the conveyor and hot air compartments are shown as supported above the floor 1 on a suitable framework 2, though in some cases the compartments may be carried directly on the floor or on the walls of the packing house, depending on conditions.

In construction the body of the apparatus comprises a rectangular casing of top, bottom and side walls, numbered 3, 4 and 5 respectively and separated longitudinally by an intermediate wall 6 which divides the casing into a conveyor or treating chamber 7 and a hot air chamber 8.

Within the treating chamber 7 are superimposed belt conveyors 9 preferably of coarse wire mesh suitably supported and passing over end rollers vertically staggered so that fruit fed to one end of the upper run of the top conveyor will drop from the end of the upper conveyor to the top of the next lower conveyor for transportation in the opposite direction and from the end of this to the lower conveyor for final discharge therefrom to the chute 10, the conveyors being driven in opposite directions through suitable gearing 11 from a suitable motor 12 by means of a pinion 13 on the end of the motor shaft 14.

The fruit is continuously fed to the upper conveyor through a chute 15 uniformly supplied with fruit as by means of an elevator 16 which in turn is fed by any suitable feeding device such as a shaker feeder, not shown in the drawings.

The walls of the casing and partition are double and are heat insulated as by paper or asbestos lining and sawdust filling or other good heat insulator, and at one end of the conveyor chamber is a vent pipe 16 provided with a damper control 17, while at the other end hot air is forced into the hot air compartment through a pipe 18 leading from a power blower 19.

The air handled by the blower is preheated by being drawn through a series of hot steam pipes 20 arranged within a casing 21 surrounding the intake of the blower, the casing 21 being open at its outer end and provided with a screen 22 to keep out foreign matter.

The hot air delivered to compartment 8 is again heated by steam pipe coils 23—24 placed along the partition wall 6 and from which compartment the highly heated air passes through openings 25 spaced along the partition and into the conveyor compartment.

Deflecting doors 26 are arranged at each opening so that the amount of hot air entering the conveyor chamber can be varied at different points along the conveyors by varying the angular setting of the doors as indicated in Fig. 4, each door being provided with a flat rod 27 pivotally connected to the door and projecting through a small slot in the outer wall of the casing so that it can be pushed in or out to open or close the door to the point desired.

Thus the hot air, in the auxiliary compartment is forced across the reheating coils in the compartment directly into the conveyor chamber. As a guide to proper setting of the deflector doors 26 thermometers (not shown) extend from different parts of the casing, or are mounted within and are viewed through suitable windows.

To keep the wire conveyor belts tight, the conveyor rolls at the receiving end of the chamber are mounted on a tension frame 28 controlled by take-up screws 29 projecting out of the end of the casing.

One or more large doors in the side of the casing as at 30 provide for entrance of a mechanic for making any necessary adjustments to the interior mechanism.

One or both ends of the conveyor chamber are preferably provided with a glass panel and the interior of the chamber equipped with electric lamps which may be switched on when it is desired to see inside without stopping the machinery, and such construction being well understood is omitted from the drawings to avoid confusion of unnecessary detail.

In operation the speed of the conveyors is so adjusted that the fruit remains under treatment to hot air for about twenty minutes, and the heat of the various steam coils is so adjusted that the air acting on the fruit is raised to about 210 degrees Fahrenheit, the length of treatment insuring a complete heating of the fruit internally to this temperature.

The above treatment applied to dried figs has been found equal to the steaming processes and various gas treatments heretofore used to sterilize the fruit and has the advantage of being much cheaper and easier to apply without harmful effect on operatives working around the apparatus or on the treated fruit.

The duration of the hot air treatment results in a thorough dissemination of the natural contained moisture of the fruit without adding any from the outside, and yielding a product which is uniformly soft and free from hard spots.

From a consideration of the apparatus as described it is evident that it may be of any length or capacity, and that the heat may be varied to any degree, hence is adaptable to treatment of any kind of fruit in the general manner indicated.

We claim:

1. Apparatus for sterilizing dried fruit comprising an elongated heat insulated chamber, a foraminous belt conveyor therein adapted to convey fruit therethrough, means for feeding fruit to said conveyor and for discharging it from the conveyor and chamber, an auxiliary compartment extending along said chamber provided with spaced openings leading thereto, means for forcing hot air to said compartment, and means for reheating the hot air within said compartment as it passes through said openings.

2. Apparatus for sterilizing dried fruit comprising an elongated heat insulated chamber, a foraminous belt conveyor therein adapted to convey fruit therethrough, means for feeding fruit to said conveyor and for discharging it from the conveyor and chamber, an auxiliary compartment extending along said chamber provided with spaced openings leading thereto, means for forcing hot air to said compartment, and steam coils within said compartment adjacent said openings between which coils the hot air must pass for reheating the hot air within said compartment.

3. Apparatus for sterilizing dried fruit comprising an elongated heat insulated chamber, a foraminous belt conveyor therein adapted to convey fruit therethrough, means for feeding fruit to said conveyor and for discharging it from the conveyor and chamber, an auxiliary compartment extending along said chamber provided with spaced openings leading thereto, means for forcing hot air to said compartment, and means for selectively varying the amount flowing through the respective openings comprising pivotally mounted air deflectors at each opening provided with operating handles extending through the wall of the compartment.

4. Apparatus for sterilizing dried fruit comprising an elongated box provided with a longitudinal dividing wall within separating the box into two parallel chambers and said wall having spaced openings therethrough, air deflecting doors arranged at the openings for deflecting air from one chamber to the other chamber, superimposed belt conveyors in one of said chambers arranged to convey fruit received by the upper conveyor back and forth in the chamber for discharge from the lower conveyor, the other chamber being arranged and adapted to carry the air for deflection into the belt conveyor chamber through said air deflecting doors in the wall separating the two chambers and steam coils secured on said dividing wall and passing over said spaced openings whereby said hot air must pass through said coils in passing from the air-carrying chamber into the chamber containing the belt conveyor.

JOHN G. TYLER.
CHARLES C. TAYLOR.
WILLIAM S. JOHNSON.